Dec. 15, 1953  S. SIMPSON  2,662,403
DRY GAS METER
Filed May 8, 1951  2 Sheets-Sheet 1
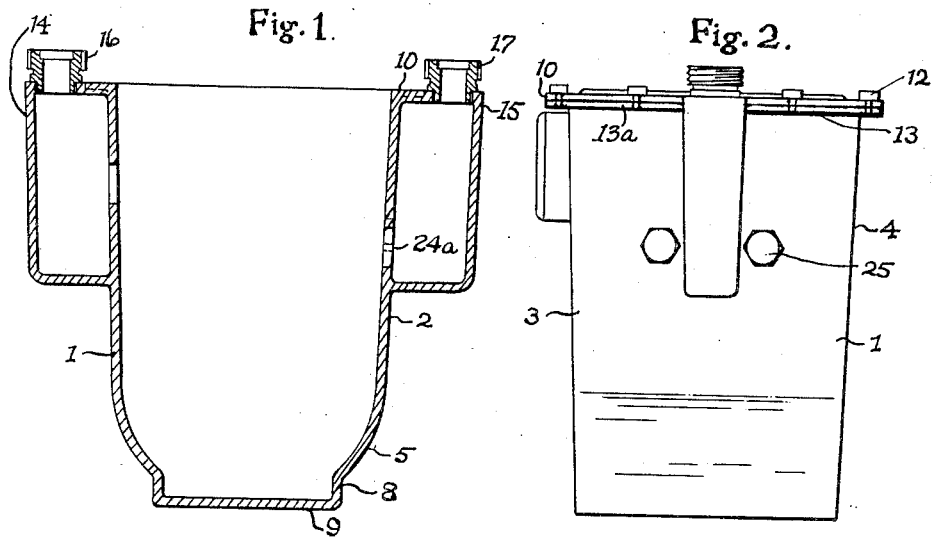
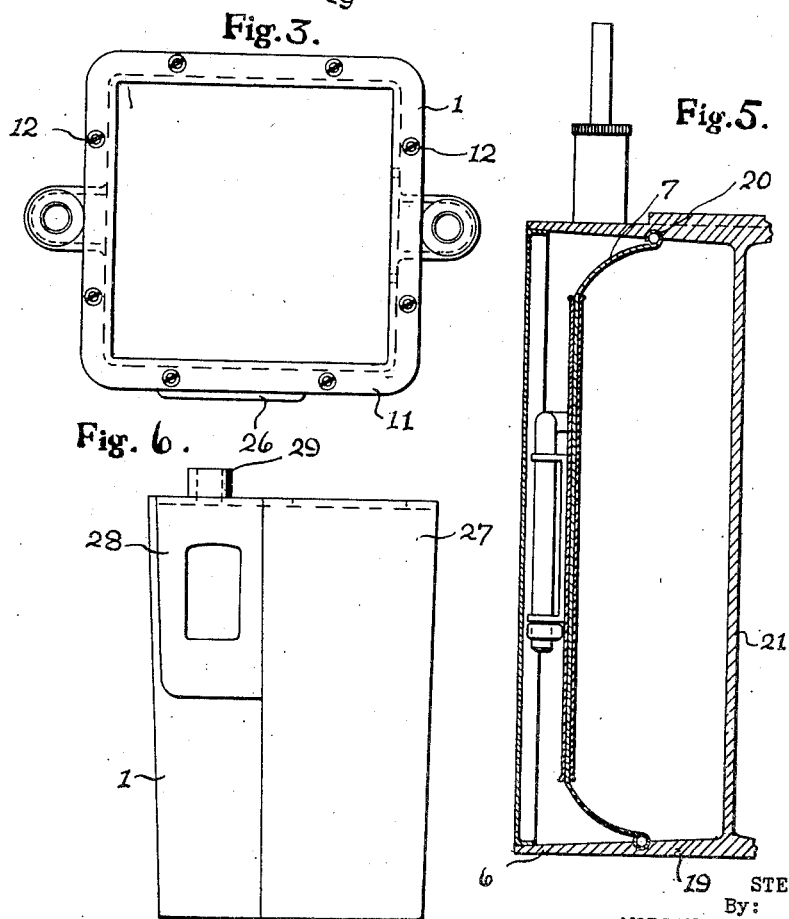
INVENTOR:
STEPHEN SIMPSON
By:
MORGAN, FINNEGAN & DURHAM
ATTORNEYS Dec. 15, 1953  S. SIMPSON  2,662,403
DRY GAS METER
Filed May 8, 1951  2 Sheets-Sheet 2

INVENTOR:
STEPHEN SIMPSON
BY: MORGAN, FINNEGAN & DURHAM
ATTORNEYS

Patented Dec. 15, 1953

2,662,403

UNITED STATES PATENT OFFICE 2,662,403

DRY GAS METER

Stephen Simpson, Poundsgate, Newton Abbot, Devon, England

Application May 8, 1951, Serial No. 225,120

1 Claim. (Cl. 73—274)

The invention relates to dry gas meters.

The invention has among its objects to provide a gas meter of simple construction with the outer casing cast, die-cast or moulded from metal, metal alloy, or plastic, and formed of a minimum number of parts, thus reducing the cost of materials and labour.

According to the invention, the outer casing of a dry gas meter is cast or moulded as a single unit with sides and back and front walls of the casing tapered downwardly towards the base, so as to facilitate casting, and adapted to receive the operative or moving parts of the meter, which is formed as a single unit and secured in position on an inner wall of the meter casing, a substantially flat rectangular cover plate being secured on the top of the casing with gas-tight seal.

According to the invention furthermore, the diaphragm chambers including the partition wall between the diaphragm chambers, the valve plate and the stationary parts of the valve mechanism supported on the plate are cast or moulded in one piece to form a single unit, and secured as by screw pins to the inner wall of the meter casing with the outlet from the diaphragm chambers in register with the outlet from the meter casing.

Thus it will be appreciated that the gas meter is made up of two castings only, the one forming the meter casing and the other carrying the moving parts of the meter.

According to the invention moreover, the inlet and outlet tubes for the gas may be cast or moulded on the sides of the meter casing. In a prepayment gas meter, the shut-off valve chamber which has an inlet tube cast or moulded on the upper part, is cast or moulded on the inlet side of the meter, with a suitably shaped coverplate secured on the valve chamber.

The index box may be cast or moulded on the front wall of the meter casing, and a frame provided to carry a glass cover to cover the indices. The frame may be secured to the wall of the casing by means of screws extending from inside the casing.

The invention is diagrammatically illustrated by way of example in the accompanying drawings, in which:

Figure 1 is a transverse section through the meter casing,

Figure 2 is a corresponding end elevation,

Figure 3 is a corresponding plan,

Figure 5 is a cross section taken on line 5—5 of Figure 4, showing one only of the diaphragm chambers together with the integral partition.

Figure 6 is an end elevation of the outer casing of a meter with prepayment mechanism attached.

Figure 4:
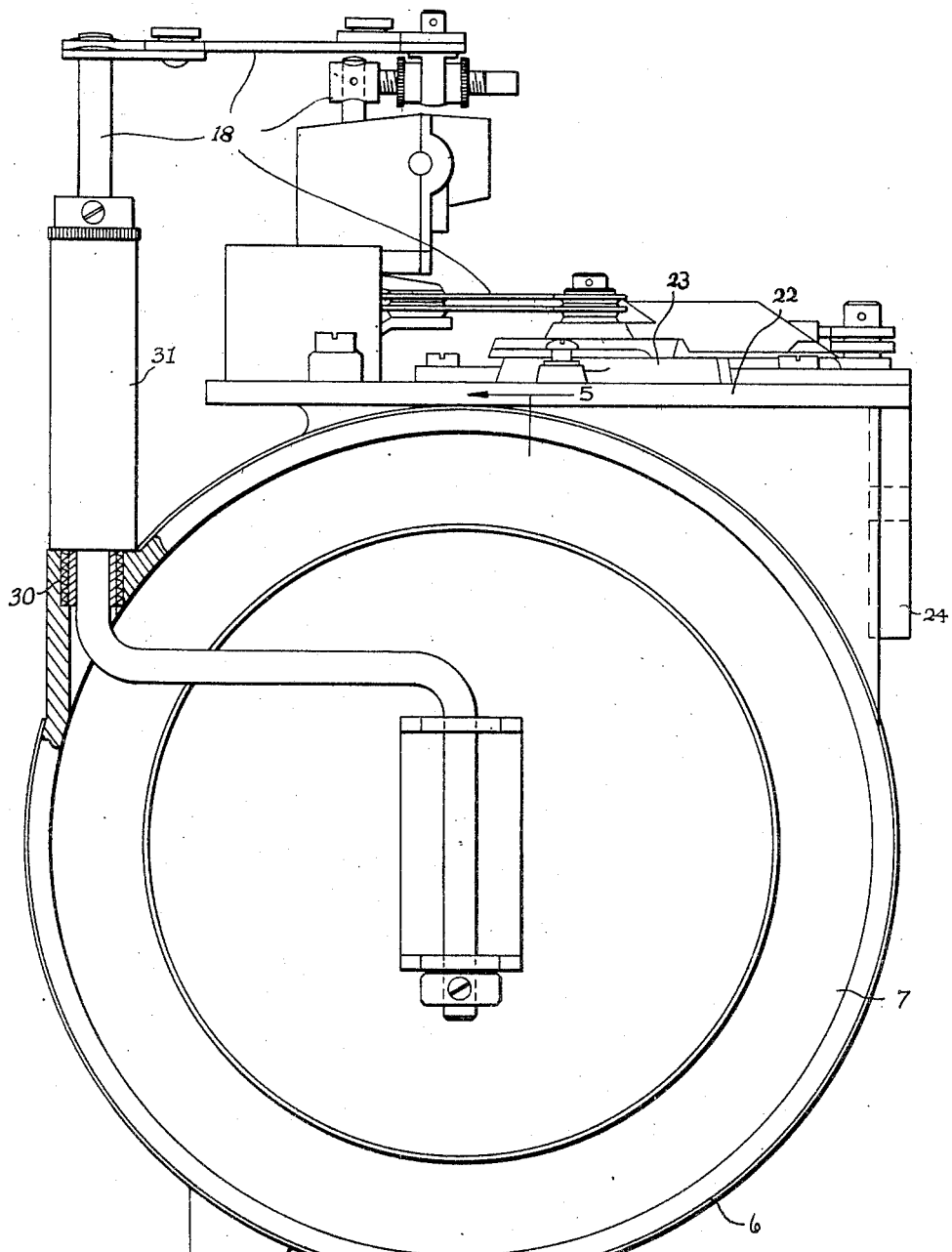
Figure 4 is a side elevation on an enlarged scale of the operative part of the meter.

In carrying the invention into effect according to the construction illustrated in Figures 1 to 5 of the drawings, in the application of the invention to a dry gas meter, the casing 1 of the meter is die-cast or moulded in one piece. The sides 2 and the front 3 and back 4 are formed with a slight taper extending from the top downwardly, so as to facilitate the casting operation.

At the lower end, the sides 2 curve inwardly at 5 following the curve of the diaphragm chambers 6 carrying the diaphragms 7. The base 8 of the casing is formed with a flat bottom 9 so that the casing will stand upright.

At the upper end the meter casing is formed with an outwardly extending flange 10 to receive a substantially flat rectangular cover 11 which is secured on the top of the casing by means of screws 12 passing through coincident holes 13 provided in a flange 13a of the casing.

Cast integrally with the casing 1 are the vertical gas inlet pipe 14 and gas outlet pipe 15 with externally screw-threaded ends 16, 17, respectively, for connection of the meter to the gas pipe in which it is to be inserted. The pipes 14 and 15 are also provided in transverse section to taper downwardly along one edge in order to facilitate the casting operation.

The moving or operative parts of the meter including the valves and valve linkage and associated parts are of known type and are indicated generally by the reference 18 in Figure 4, and do not form part of the invention.

The cylinder 19 (Figure 5) is integrally cast with a vertical partition 21 forming on each side of the diaphragm chambers 6 in which the flexible diaphragms 7 are mounted in known manner, with the circumferential edge of the diaphragm held in a peripheral groove in the diaphragm casing by means of a spring ring 20 as shown, are cast in one piece to form a single unit with the partition plate 21 between the chambers, and with the horizontal valve plate 22 (Figure 4). The stationary valve gratings or seatings indicated generally by the reference 23 are made of softer metal and cast separately. Cast integrally with the unit is a flange 24 extending downwardly from the horizontal valve plate 22. The outlet from the diaphragm chambers 6 passes through the flange 24. The flange 24 is secured, as by screws 25 to the inner walls of the meter casing 1, with the outlet from the diaphragm chamber in register with the outlet 24a leading into the outlet pipe 15. Seating 30 for the casings 31 carrying the flag wires 18 are cast in the outer periphery of the cylinder 19.

The index box 26 of the meter is cast on the front of the meter casing, and a frame provided to receive the glass, the frame being preferably screwed to the front of the meter with screws extending from the inside of the meter casing.

Referring to the modification of the invention illustrated in Figure 6 of the drawings, a casing 1 for a dry gas meter with prepayment mechanism is shown, in which the casing for the prepayment mechanism is indicated by the reference 27, and the shut-off valve chamber by the reference 28. In this construction, the casings 27 and 28 for the prepayment mechanism, and for the shut-off valve chamber respectively, are cast or moulded on the gas inlet side of the meter casing. The shut-off valve chamber 28 has an inlet tube 29 cast or moulded on the upper part, and is provided with a suitably shaped cover.

Thus it will be understood that the meter is constructed of two castings only, one supporting the operative movable parts of the meter, and a casing in which the first casting is removably mounted.

The forms of the castings is such as to facilitate the casting operation and the simplicity of design effects a considerable saving in labour, cost of material and cost of production. Furthermore, the form of the meter casing with the opening in the top enables the operative parts of the meter to be easily assembled, or removed from the casing for inspection, or repair. In addition, only one joint involving the use of not more than eight screw bolts is necessary to form an effective gas-tight seal between the casing and its cover plate.

I claim:

A dry gas meter comprising an integrally cast, substantially rectangular casing open at the top, presenting front, back and side walls having a uniform downward taper, and a flat base, there being an inlet in one side wall of said casing and an outlet in the other side wall of said casing, a cast metal unit within said casing presenting two diaphragm chambers separated by an integral partition member, said unit having an apertured horizontally disposed top plate portion for supporting cooperating valve seatings and a flat face portion substantially perpendicular to and beneath said top plate portion, said flat face portion having an outlet therein positioned beneath said top plate, means for securing said unit inside and adjacent a side wall of said casing with the outlet in the flat face portion of said unit in registry with the outlet in the side wall of said casing, a removable cover for closing the top opening of said casing, and means for securing said cover to the casing.

STEPHEN SIMPSON.

References Cited in the file of this patent

UNITED STATES PATENTS

| Number | Name | Date |
|---|---|---|
| 1,241,170 | Viney | Sept. 25, 1917 |
| 1,283,025 | Armstrong | Oct. 29, 1918 |
| 2,544,665 | Gilmore | Mar. 13, 1951 |

FOREIGN PATENTS

| Number | Country | Date |
|---|---|---|
| 455,353 | Great Britain | Oct. 16, 1936 |
| 597,974 | Great Britain | Feb. 6, 1948 |
| 606,203 | Great Britain | Aug. 10, 1948 |